United States Patent [19]
Dalinowski

[11] 4,060,719
[45] Nov. 29, 1977

[54] COMPUTER FOR SOLVING UNKNOWN PARAMETERS OF GEOMETRICAL FIGURES

[76] Inventor: Alfred A. Dalinowski, 36244 English Drive, Sterling Heights, Mich. 48077

[21] Appl. No.: 708,105
[22] Filed: July 23, 1976
[51] Int. Cl.² .............................................. G06F 7/38
[52] U.S. Cl. .................................................... 364/729
[58] Field of Search ............... 235/152, 156, 186, 190, 235/191, 192

[56] References Cited
U.S. PATENT DOCUMENTS 2,857,673 10/1958 Gabriel ........................... 235/190 X
2,879,941 3/1959 Savet ................................. 235/186
3,863,060 1/1975 Rode et al. ......................... 235/156
3,978,328 8/1976 Fabry et al. ....................... 235/156
3,979,057 9/1976 Katz et al. ......................... 235/156

Primary Examiner—David H. Malzahn
Attorney, Agent, or Firm—Jay C. Taylor

[57] ABSTRACT

The face of the keyboard of a typical minicomputer is provided with a triangle having its sides and angles closely associated with certain of the computer operating keys to facilitate determination of the dimension of an unknown side or angle when the dimensions of a sufficient number of the other sides and angles are known to enable the necessary calculation.

10 Claims, 2 Drawing Figures

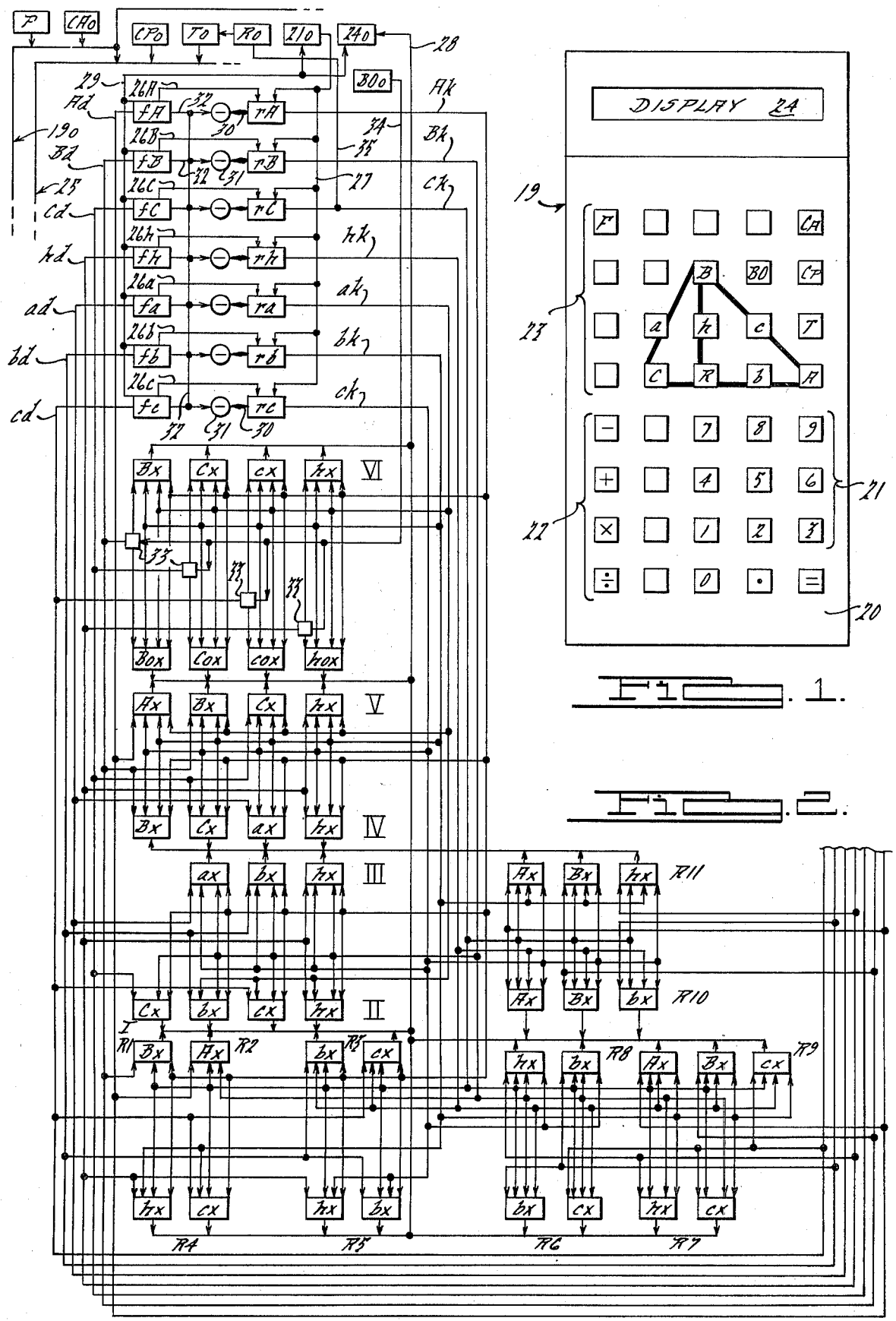

COMPUTER FOR SOLVING UNKNOWN PARAMETERS OF GEOMETRICAL FIGURES

BACKGROUND AND OBJECTS OF THE INVENTION

The present invention relates to improvements in a computer to facilitate determination of the dimensions of various unknown parameters that can be associated with a geometrical figure when sufficient dimensions are known to enable calculation of the unknown, and has a primary object of providing the keyboard of the computer with a geometrical design having parameters corresponding to the parameters of the aforesaid figure and associated with operating or parameter identifying keys of the computer. The parameter identifying keys are selectively operative for successively entering parameter identifying signals into the computer circuitry. Parameter identifying keys associated with the known parameters are first actuated in turn. Either immediately before or after the actuation of each such key, the numerical value for the dimension of the associated known parameter is entered conventionally into the computer circuitry. After all of said necessary dimensions are entered, a parameter identifying key associated with the unknown parameter is actuated to activate the circuitry which is programmed to calculate and display the unknown dimension in a conventional manner.

The geometrical design provided on the keyboard may correspond to any suitable figure, such as a polygon, conic section, or various other curves that represent a mathematical relationship. In some fields of engineering, triangulation is involved in approximately 50% of the engineer's calculations. Accordingly another and more specific object of the invention is to provide a computer as aforesaid where the design comprises a right or oblique triangle, or both, each angle and side being identified by a separate specific function key operative to cooperate with numerical value or dimension entering keys so that the dimensions of the known angles or sides necessary to enable calculation of an unknown angle or side may be entered into the circuitry. Thereafter the unknown dimension may be calculated and displayed conventionally by the computer merely by actuation of its function key associated with the unknown parameter.

Although the present invention is particularly suitable for use with modern electronic computer technology, the term "circuitry" as employed herein may also apply to mechanical or electro-mechanical calculating means capable of solving or approximating the solutions to the problems of the type referred to herein.

Other objects of this invention will appear in the following description and appended claims, reference being had to the accompanying drawings forming a part of this specification wherein like reference characters designate corresponding parts in the two views.

FIG. 1 is a diagrammatic plan view of a typical electronic mini-computer or pocket calculator embodying the present invention.

FIG. 2 is a diagrammatic view of a portion of the circuitry in the computer of FIG. 1.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

DESCRIPTION OF A PREFERRED EMBODIMENT

Referring to the drawings, a typical electronic calculator 19 comprises a keyboard or panel 20 having numerous manually operated circuit actuating keys for selectively interconnecting various portions of the programmed circuitry within the calculator housing. The actuating keys, FIG. 1, include a set of function keys 21 (identified individually by the decimal point (.), cipher 0, and integers 1 through 9) for entering numerical or dimensional values into the circuitry, a set of function keys 22 (identified by conventional mathematical symbols $=$, $-$, $+$, $\times$ and $\div$) for performing self-explanatory operations on the numerical values, and a set of function keys 23 for predetermining the operating mode of the calculator. The panel or plate 20 also provides a display panel 24 for displaying the numerical value or "answer" resulting from operation of the calculator in accordance with the selective operation or depression of the keys 21, 22, and 23.

The answer or numerical value displayed by 24 will preferably comprise self-illuminated numbers carried out to a predetermined degree of accuracy, although over conventional display devices may be used, including a print-out on a tape or the like. The keys 23 may be interrelated to effect multiple functions and various modes of operation in turn for the computer, as for example to perform trigonometric, logarithmic, or exponential operations by way of example, depending upon the pattern of actuation of the keys. The calculator described thus far may be conventional and may be powered from a self-contained battery or from an external power source.

One or more geometrical patterns may be scribed or marked on the panel or face 20 with predetermined parameters or characteristics coinciding with certain of the function keys 23. In the present instance an oblique triangle is clearly outlined on the panel 20 with a base parallel to the display 24 and apices coinciding respectively with three function keys 23 identified hereinafter by A, B and C respectively to denote the three associated interior angles of the triangle. The two sides of the triangle that define the angle B pass respectively through keys 23 identified hereinafter by the letters $a$ and $c$ to denote the associated sides. The two keys immediately below key B are identified respectively by the letters $h$ and R. The letter $h$ may represent any predetermined characteristic or parameter of the triangle comprising a function of its sides and angles, such as the area, perimeter, or altitude for example. In the present instance, $h$ and R lie on the vertical line comprising the altitude of the triangle. Hereinafter, $h$ will denote the altitude. R may denote the right angles formed by the altitude $h$ and base $b$, but is preferably employed as described below to establish a mode of operation when the angle C is 90°. The base $b$ of the triangle is associated with the key 23 immediately to the right of the key R.

The indicia A, B, C, $a$, $b$, $c$ and $h$ designating the angles, sides and altitude of the triangle are employed herein for reference purposes only and preferably are not marked on the associated parameter identifying keys 23. The positions of the latter keys relative to the triangle are sufficient to enable an operator to employ the invention described below. Also the function keys 23 and triangle described are preferably arranged so that each side $a$ and $c$ and altitude $h$ passes through only the associated key $a$, $c$ and $h$ respectively. The base or side $b$ passes horizontally through only the keys R and $b$.

If the dimensions of any three of the six parameters comprising the angles A, B, C and sides $a$, $b$ and $c$ are known (except if the three known parameters are all angles) the remaining dimensions of these parameters can be readily calculated, and in fact the dimensions of other parameters of the triangle, such as the altitude $h$, area, perimeter etc. can also be calculated. In some cases, if only two parameters are known, a third is determined. Numerous equations or relationships exist between the dimensions of the triangle to enable computation of the unknown dimension from three known dimensions. Likewise many sophisticated circuit components and systems are available to the electronic computer art for performing the calculations required. Accordingly, the present invention is not particularly concerned with details of the circuit components illustrated in FIG. 2, which are well known individually, although they are combined in a novel relationship with respect to the triangle on 20 to comprise my invention.

Assuming that only dimensions for real triangles are involved, six distinct situations prevail as follows:

I. Any two angles, say A and B, are known.

$$C = 180° - (A + B)$$

II. Any two angles, say A and B, and the side opposite one of them, say $a$, are known.

$$b = a \sin B / \sin A$$

$$c = a \sin [180 - (A+B)] / \sin A$$

III. Any two angles, say A and B, and their common side $c$ are known.

$$a = c \sin A / \sin [180° - (A+B)]$$

$$b = c \sin B / \sin [180 - (A+B)]$$

IV. Any two sides, say $b$ and $c$ and the included angle A, are known.

$a$ is determined by $a^2 = b^2 + c^2 - (2bc) \cos A$

C is determined by $\sin C = (c/a) \sin A$ $B = 180 - (A+C)$

V. The three sides are known.

A is determined by $\cos A = (b^2 + c^2 - a^2)/2bc$

B is determined by $\cos B = (a^2 + c^2 - b^2)2ac$

C is determined by $\cos C = (a^2 + b^2 - c^2)/2ab$

VI. Any two sides, say $a$ and $b$, and the angle opposite one of them, say A, are known.

B is determined by $\sin B = (b/a) \sin A$ $C = 180 - (A+B)$ $c = a \sin C / \sin A$ In case VI there may be two solutions. B may be acute or obtuse. The calculator will preferably be programmed to calculate the acute angle B and the associated values for C and $c$, but the operator should remember that if the acute angle B is greater than angle A, than an obtuse angle $B_o = 180 - B$ and corresponding values for $C_o$ and $c_o$ might be the preferred solution for the specific problem. Of course the computer may be readily programmed to selectively calculate and display either or both sets of answers.

The examples above in the situations I–VI are sufficient for solving the three unknown dimensions for any triangle, regardless how the problem triangle and its known dimensions are orientated. Any triangle or its mirror image may be rotated to conform to the orientation of the triangle illustrated on 20 and to one of the situations I–VI. By way of explanation, if in situation III above, the angles C and B and their common side $a$ are known for a problem triangle, that triangle may be rotated clockwise about the apex of its angle A until its side $c$ replaces $b$ as the horizontal base. The known angles B and C and their common side $a$ of the problem triangle will then be located at positions corresponding to the known angles A and B and side $c$ of situation III.

All of the possible combinations of three known parameters and their associated unknown parameters for the situations I–VI are tabulated below:

| Situation | Known | | Unknown (to be solved) |
|---|---|---|---|
| I | AB | (2 angles) | C |
| | AC | | B |
| | BC | | A |
| II | ABa | (2 angles and side | C,b,c |
| | ABb | opposite one of them) | C,a,c |
| | ACa | | B,b,c |
| | ACc | | B,a,b |
| | BCb | | A,a,c |
| | BCc | | A,a,b |
| III | ABc | (2 angles & common side) | C,a,b |
| | ACb | | B,a,c |
| | BCa | | A,b,c |
| IV | Abc | (2 sides & included angle) | B,C,a |
| | Bac | | A,C,b |
| | Cab | | A,B,c |
| V | abc | (3 sides) | A,B,C |
| VI | Aab | (2 sides and angle opposite | B,C,c |
| | Aac | one of them —ambiguous) | B,C,b |
| | Bab | | A,C,c |
| | Bbc | | A,C,a |
| | Cac | | A,B,b |
| | Cbc | | A,B,a |

The underlined known parameters tabulated above correspond to the examples described in the situations I–VI. The associated unknown parameters may be determined in accordance with operation of the calculator 19 as described below with reference to FIG. 2. The necessity of reorientating any problem triangle as described above to determine the unknown parameters associated with the non-underlined combinations of known parameters may be avoided merely by adding additional parallel programmed calculator circuits similar to those described herein.

The computer circuitry 19o connected to power P in FIG. 2 may comprise a number of interrelated circuits including circuit 25 which contains all the circuitry associated in any manner with the triangle on the panel 20. The various connections, circuits, and circuit components described herein will be called "circuits" whether or not they are closed or complete circuits. Operation of function key T, FIG. 1, activates circuit To, FIG. 2., to select and isolate circuit 25 from the portions of the circuit 19o that are not concerned with the triangle and may connect circuit 25 to the power P. Other function keys CA, CP, and BO activate circuits CAo, CPo, and BOo respectively to perform as described below.

Each of the function keys A, B, C, *h*, *a*, *b*, and *c* is operative, as for example by being depressed, to activate an associated function circuit *f* (of the set *f*A, *f*B, *f*C, *fh*, *fa*, *fb*, and *fc* respectively) each of which is operatively connected by an associated connection 26 (of the set 26A, 26B, 26C, 26*h*, 26*a*, 26*b*, and 26*c* respectively) with an associated receptor circuit *r* (of the set *r*A, *r*B, *r*C, *rh*, *ra*, *rb*, and *rc* respectively) to enable the latter to receive a dimensional signal representative of a numerical value from dimension entering circuit 21*o*, which in turn is activated in a conventional manner in accordance with the pattern of actuation of the dimension entering or number keys 21, i.e. O, (.) and 1–9.

Circuit 21*o* is connected in parallel via 27 with the receptor circuits *r* to transmit its dimensional signal to the one only thereof that is "enabled" as described herein. Each of the circuits *r* is also connected by an associated "known" dimension circuit *k* (of the set A*k*, B*k*, C*k*, *hk*, *ak*, *bk*, and *ck*) with the calculator circuits *ix* (where *i* symbolically represents any one of the prefixes A—*c* to identify the unknown parameter to be calculated by the associated calculator circuit) to conduct the known dimensional signal to the latter calculator circuits as described below.

Each calculator circuit *ix* is programmed to calculate the value of the associated unknown parameter *i* in accordance with any suitable equation that defines the unknown in terms of the known parameters, as for example of the type described in the situations I–VI. Also each calculator circuit *ix* is operative only after it receives the dimensional signals from the known parameters corresponding to one of the above tabulated combinations that are necessary and sufficient for the calculation, and then only after it also receives a display signal corresponding to one of the unknown parameters associated with the latter known combination. Each display signal is transmitted via one of the connections *d* (of the set A*d*, B*d*, C*d*, *hd*, *ad*, *bd*, and *cd*) with a corresponding function circuit *f*. Thus each calculator circuit *ix* is unique in that it is connected with a combination of known dimension circuits *k* and a display connection *d* that is different from the corresponding combination of circuits connected with each of the other calculator circuits *ix*.

It is apparent in the above regard that each calculator circuit *ix* may comprise, in addition to a programmed or calculating circuit, a conventional "and" gate that enables transmission of the aforesaid necessary and sufficient known dimensional signals to its programmed portion for operating thereon only when all of the known signals and the associated display signal are received by its "and" gate portion. Also each calculator circuit *ix* comprises a time delay portion operative to transmit a signal representative of the calculated value or dimension of the unknown parameter via connector circuit 28 to the display circuit 24*o* after a momentary time delay of sufficient duration to allow the circuit 24*o* to be reset or cleared from any previously received signal, as described below.

The function circuits *f* are all connected in parallel via 29 with both the dimension entering circuit 21*o* and the display circuit 24*o*, and each circuit *f* is operative by actuation of the associated function key 23 in the set A—*c* for sensing a signal via 29 to the circuits 21*o* and 24*o* to reset and clear the latter as aforesaid. Each function circut *f* is also operative for transmitting a display signal via the associated display connection *d* to the appropriate calculator circuits *ix*, thereby to activate one of the latter circuits *ix* as described above provided it has already received the necessry and sufficient known dimension signals.

The activation or enabling of each of the circuits *r* via the associated circuit 26 also actuates the enabled circuit *r* to send a signal via 30 to the associated normally closed circuit breaker 31 to momentarily open the latter and break the connection with the last named enabled circuit *r*. Also activation of any one of the function circuits *f* sends a momentarily delayed signal via the associated parallel connections 32, 31 and 30 to all of the receptor circuits *r* except to the one thereof that has just been enabled or activated as explained above and is thereby associated with the open circuit breaker 31. The circuits *r* that receive the time delayed signal via 32, 31 and 30 are reset by that signal and disabled, so to speak, so that none of the disabled circuits *r* will receive a dimensional signal via 27 until it is subsequently enabled by actuation of the associated function circuit *f*. The term "momentarily" herein may refer to a fraction of a microsecond because the time delayed signal through 32, 31 and 30 from the activated function circuit *f* need only be delayed sufficiently to allow time for transmission of the enabling signal from the latter function circuit *f* to its associated receptor circuit *r* via the associated circuit 26. Similarly the time delayed signals from the calculator circuits *ix* to display circuit 24*o* need only be delayed sufficiently to allow time for the latter circuit to be reset by the resetting signal via 29 from one of the *f* circuits.

By way of example, assume key A has been actuated to activate *f*A and *r*A via 26A and that a dimensional signal has thereafter been applied to *r*A via 21*o* and 27, and thus via A*k* to the associated calculator circuits *ix*. When another key, say B, is then actuated to activate circuit *f*B, the latter will immediately enable *r*B for reception of a dimensional signal from 21*o*. *r*B in turn will immediately open the circuit breaker 31 to which it is connected by 30. Thereafter the time delayed signal from *f*B will be transmitted via 32, 31 and 30 to all of the circuits *r* except *r*B which is associated with the open circuit breaker 31. Circuit *r*A may thus be cleared from the prior dimensional signal if any and in any event is reset or disabled, so that as a result of its having been enabled previously to receive the dimensional signal for angle A, it will not receive a dimensional signal that is intended only for the subsequently enabled circuit *r*b. After the momentary time interval required for the resetting signal via circuits 32, 31 and 30 to reset circuit *r*A, circuit breaker 31 will automatically revert to its normally closed condition.

In the above regard, circuit breaker 31 may be a conventional normally closed circuit that is capable of being momentarily opened for a predetermined time interval, after which time interval it automatically returns to its normally closed condition. The circuits *r* may comprise conventional resettable "and" gates that do not retain any dimensional signals received from 21*o*, but permit transmission of such signals to the associated known circuits *k* only when enabled by a signal from the associated circuit 26.

Each of the abovementioned circuits associated with any one of the function keys A—*c* operates in the same manner as the others in providing information or signals to the several sets of calculator circuits *ix* (corresponding to the situations I–VI) so that a limited number of examples of the operation will be sufficient for understanding the invention. Assuming that in the triangle of FIG. 1, A, B and $a$ are known, the values for angle C and the sides $b$ and $c$ may be displayed at 24 by entering the known values in turn, the order of entry being immaterial, and by thereafter demanding a display of the unknown dimension as follows.

If for example $A=30°$, $B=60°$, and $a=5$, and the value for angle A is t be arbitrarily entered first, after actuating key T to place the computer 19 in the triangulation mode of operation, key A is depressed to activate circuit $fA$ which enables receptor circuit $rA$ via 26A to receive and transmit a dimensional signal from 21o. $fA$ also transmits a resetting signal via 29 to 21o and 24o to clear these circuits from previously acquired information if any. The function keys 21 numbered 3 and 0 are then depressed in turn to enter a dimensional signal representative of 30° into circuit 21o, which in turn makes that signal available via 27 at all of the circuits $r$. Only $rA$ has been enabled, so the remaining circuits $rB$—$rc$ remain inoperative. The enabled $rA$ transmits the dimensional signal for 30° to all of the calculator circuits $ix$ that are programmed to operate on the known value for angle A, including $Cx$, $bx$, $cx$ and $hx$ in the situations I and II.

Similarly key B associated with the known angle B is then actuated to activate $fB$, which via 26B enables only receptor circuit $rB$ to receive and transmit the next successive dimensional signal from 21o, which signal is then provided at $rB$ via 27 by acutuation of function keys 21 numbered 6 and 0 in turn. The 60° signal is similarly transmitted from $rB$ via $Bk$ to the calculator circuits $ix$ that are programmed to operate on the known value for B, including $Cx$, $bx$, $cx$, and $hx$ in I and II. Dimensional signals from A and B are now available at the calculator circuit $Cx$ in I.

To display the value of angle C at 24, function key C is now actuated to activate $fC$, which transmits a display signal via $Cd$ to $Cx$ in situation I to complete the requirements for operation of the latter circuit to calculate $C=90°$ and transmit a momentarily delayed signal representative of 90° to the display circuit 24o via connection 28. The momentary delay will afford time for the resetting signal via 29 to clear 21o and 24o from previously acquired information.

$Cd$ is also connected with other $Cx$ calculator circuits in the groups II–VI (for activating these other calculator circuits in other situations) but such other connections will be ineffective because none of the other calculator circuits will have received the unique combination of known dimensional signals representative of A and B and the display signal C, which combination exists only for $Cx$ in situation I. Activation of $fC$ to initiate the display signal $Cd$ will also enable $rC$ to receive a dimensional signal from 21o, but since angle C is unknown, no such dimensional signal will be provided at $rC$. Similar remarks apply in regard to the operation of all of the other calculator circuits $ix$.

Whether or not the value of angle C is displayed by operation of the function key C as described above, after the known values for angles A and B have been entered into the I and II circuitry, the remaining values for the sides $b$ and $c$ may similarly be displayed by first actuating key $a$ and entering the known value for side $a$ and by thereafter actuating the function keys $b$ and $c$ in turn, the order of actuation again being immaterial.

Specifically the known value 5 for side $a$ is entered into the system by actuating function key $a$, which activates circuit $fa$ to enable the receptor circuit $ra$. Key number 5 in the set 21 is then actuated to provide a signal representative of the number or dimension 5 to circuit $ra$, which signal is then transmitted via $ak$ to the calculator system, including calculator circuits $bx$, $cx$ and $hx$ of set II. These circuits are programmed to solve for $b$, $c$ and $h$ respectively and to transmit the appropriate signal to 24o for displaying the associated "solved" dimension when signals for the known values of A, B, and $a$ and the associated diaplay signal ($bd$, $cd$ or $hd$) are provided. In this case the dimensional signals 30°, 60° and 5 for angles A and B and side $a$ have been provided. The calculating circuits $bx$, $cx$ and $hx$ in II may be activated in turn (the order or actuation being immaterial) to calculate the dimensions for $b$ and $c$ and altitude $h$ by actuation of the appropriate function key $b$, $c$ or $h$.

If key $c$ for example is actuated, a signal via $cd$ is transmitted to complete the requirements for operation of the programmed circuit $cx$ in II (programmed to calculate $c = a\ \sin C/\sin A = 10$) and send the signal for $C=10$ via 28 to the display circuit 24o and thus to display the numerical value 10 at display 24. The values for $b$ and $h$ may similarly be displayed by actuation of function keys $b$ and $h$ in turn.

Actuation of the keys $c$, $b$ and $h$ will also enable receptor circuits $rc$, $rb$ and $rh$ in turn, but as already described, no corresponding dimensional signal will be entered into the circuitry because the numbered keys in the set 21 will not be actuated. Also as in the situations already described, the display demand signals via $bd$, $cd$ and $hd$ will not operate the other calculator circuits in the sets III–VI because none of these circuits is responsive to the unique combination of known values A, B and $a$.

The determination of $h$ is accomplished after input of the parameters A, B, and $a$, merely by actuating function key $h$. Although $h$ is in the position of the altitude for the FIG. 1 triangle, $h$ need not be limited to such a location and it may also represent any other parameter that can be calculated from the known parameters. In fact any number of calculator circuits $h1x$, $h2x$, $h3x$, etc. may be provided in the circuitry, similarly to $hx$ shown, and other function keys 23 may be utilized to actuate such calculator circuits to determine area, perimeter and the like. After all the desired unknown parameters that the calculator is programmed to display have been described, the function key CP (clear problem) may be actuated to activate $CPo$ and clear the circuitry 25 (without eliminating the T or triangulation mode of operation) and ready the circuitry for the next triangulation problem, as is customary. When it is desired to eliminate the T mode, then CA is actuated to activate circuit $CAo$ and clear the calculator for operation in a different mode.

The determination of the unknown parameters in the situations III–VI is performed in the same manner as described in regard to the situations I and II, except that in some instances in situation VI as explained above, two solutions might exist.

Accordingly in the situation VI illustrated, each of the circuits $Ak$, $ak$, and $bk$ for the known dimensional signals extends to two sets of calculator circuits $Bx$, $Cx$, $cx$, and $hx$ and $Box$, $Cox$, $cox$, and $hox$. The display circuits $Bd$, $Cd$, $cd$, and $hd$ extend to the respective pairs of circuits $Bx$-$Box$, $Cx$-$Cox$, $cx$-$cox$ and $hx$-$hox$ through separate flip-flop circuits 33, each being operative for every odd number of times that it is actuated by a display signal to direct that signal to the corresponding calculator circuit $Bx$, $Cx$, $cx$, or $hx$ for calculating the associated unknown parameter for the acute angle B.

The second and every even number of times thereafter that each flip-flop circuit 33 is actuated by a display signal, it will send that signal to the associated calculator circuit B*ox*, C*ox*, c*ox* or h*ox* for calculating the associated unknown parameters for the obtuse angle B*o*, provided that an obtuse angle B*o* is possible with the specific problem triangle.

An alternative circuit comprises a function key such as BO (B Obtuse) operatively connected with flip-flop circuit BO*o* to actuate the latter. BO*o* is connected via 34 to each of the flip-flop circuits 33 in parallel to actuate all of the latter simultaneously to deactivate their above described flip-flop function and flip simultaneously to the condition for sending the display signals B*d*, C*d*, c*d* and h*d* to the aforesaid first set of calculator circuits B*x*, C*x*, c*x*, and h*x*, when BO is first actuated, for calculating the associated unknown parameters when B is acute, and thereafter upon the second actuation of BO, to flop the circuits 33 to the condition for sensing the display signals to the aforesaid second set of calculator circuits B*ox*, C*ox*, c*ox* and h*ox* for calculating the unknown parameters when an obtuse angle B*o* exists.

If the problem triangle is a right triangle, then key R may be actuated to enable operation of the circuitry 25 in an R mode by activating circuit R*o*, which in turn actuates T*o* for operation of the computer as described above and which also sends a continuous 90° dimensional signal via 35 to C*k*. In that regard R*o* operates similarly to 21*o* except that R*o* is specific for supplying only a 90° **dimensional signal for circuit C*k*.**

The right triangle is merely a specific case for the oblique triangle where angle C is known to be 90° and $a=h$. The eleven combinations of known parameters and their associated unknown parameters where $h$ replaces $a$ are tabulated below. A calculator circuit *ix* for use in the R mode is illustrated in FIG. 2 for the unknowns associated with all of the combinations of known parameters tabulated below.

| | Known (C=90°) | Unknown |
|---|---|---|
| R1 | A | B |
| R2 | B | A |
| R3 | Ah | B,b,c |
| R4 | Ab | B,h,c |
| R5 | Ac | B,h,b |
| R6 | Bh | A,b,c |
| R7 | Bb | A,h,c |
| R8 | Bc | A,h,b |
| R9 | hb | A,B,c |
| R10 | hc | A,B,b |
| R11 | bc | A,B,h |

Operation of the computer 19 in the R mode is the same as described above except that the portion of the triangle at the left of the altitude $h$ may be ignored and only one of the acute angles A or B (where B is now the angle included between $h$ and $c$) need be known to compute the other, and only two sides (or one side and one angle) need be known to determine the other parameters. A single illustration of the operation in the R mode will suffice for understanding.

Assume for example that $A=36.86993°$ and $b=4$. To solve for $h$, actuate key R to initiate the R mode as described above. Acutate key A to activate *f*A and enable *r*A as described above. Enter 36.86993 by actuating the number keys 21 in the following order 3,6,., 8,6,9,9, and 3. Circuit *r*A will receive the signal for the dimension 36.86993 from circuit 21*o* via 27 and will transmit that signal via A*k* to the associated calculator circuits including the circuits B*x* in R1 and h*x* and c*x* in R4. Now actuate key *b* and enter the dimensional signal for 4, which will be transmitted via *bk* to the above mentioned calculator circuits B*x*, h*x* and c*x*. The dimensional signal for $C=90°$ has already been provided at these latter circuits via 35. Now depress key *h* to provide the display signal via *hd* to all the calculator circuits *hx*. Only the above mentioned calculator circuit *hx* in R4 will have been provided with the dimensional signals for $C=90°$, $A=36.86993$, $b=4$, and the display signal *hd*. The conditions for operation of its associated "and" gate are thus satisfied and that calculator circuit *hx* only will be activated to perform its programmed calculation on the aforesaid dimensional signals transmitted thereto and to transmit the resulting dimensional signal for $h=3$, (which may be determined by the calculator circuit according to the relationship h=btanA by way of example) via 28 to circuit 24*o* for displaying the number 3 at 24. The mathematical relationships between the sides and angles of the right triangle are too well known to necessitate further discussion.

To determine *c* and B, depress keys *c* and B in turn, the order again being immaterial, to send the appropriate display signal to the calculator circuit *cx* in R4 and B*x* in R1, thereby to activate those calculator circuits in turn to calculate the values for $c=5$ and $R=53.13007$ and transmit those signals via 28 to display circuit 24*o* for displaying the appropriate values at 24.

I claim:

1. In a calculating device for determining an unknown dimension of a geometrical figure when necessary and sufficient known dimensions are available to enable calculation of said unknown dimension, the combination of means defining a geometrical design having parameters corresponding to parameters of said figure, a plurality of keys selectively operative for providing input signals representing said known dimensions and selected parameters of said design, programmed means responsive to said input signals for providing an output signal representing said unknown dimension, and display means responsive to said output signal for displaying said unknown dimension.

2. In the combination according to claim 1, said keys include parameter identifying keys associated with selected parameters of said design and also include dimension identifying keys, at least certain of said parameter identifying keys being located in proximity to their associated parameters.

3. In the combination according to claim 2, said means defining said design including a keyboard, the last named keys being arranged on said keyboard according to the pattern of said design.

4. In the combination according to claim 1, said design comprising a triangle having separate parameter identifying keys associated with the angles and sides of said triangle respectively.

5. In the combination according to claim 4, said triangle having a horizontal base, said design including a vertical line representing the altitude of said triangle, and one of said parameter identifying keys being associated with said vertical line, said angles, sides and altitude comprising selected parameters of said triangle and each of said selected parameters having its associated parameter identifying key proximate thereto.

6. In the combination according to claim 1, said keys including parameter identifying keys associated with selected parameters of said design and also including dimension entering keys, said programmed means having means responsive to a succession of paired operations of said keys comprising operation of a selected parameter identifying key followed by selected operation of said dimension entering keys for providing a corresponding succession of information signals representing selected parameters and dimensions thereof, said display means comprising means responsive to a predetermined number of said information signals and the selective operation of a parameter identifying key for displaying the dimension of the parameter associated with the latter key.

7. In the combination according to claim 6, said design comprising a triangle having a separate parameter identifying key associated and in close proximity with each angle and side of said triangle.

8. In the combination according to claim 1, said keys including parameter identifying keys associated with selected parameters of said design and also including dimension entering keys, said programmed means having means responsive to a succession of paired operations of said keys comprising operation of a selected parameter identifying key associated with selected operation of said dimension entering keys for providing a corresponding succession of information signals representing selected parameters and dimensions thereof, said display means comprising means responsive to a predetermined number of said information signals and the operation of selected parameter identifyng keys for successively displaying the dimensions of the parameters associated with the latter keys.

9. In the combination according to claim 8, at least certain of said parameter identifying keys being arranged according to the pattern of said design.

10. In the combination according to claim 9, said design comprising a triangle having a separate parameter identifying key associated with each angle and side of said triangle.

* * * * *